US012769088B2

(12) United States Patent
Huo et al.

(10) Patent No.: US 12,769,088 B2
(45) Date of Patent: Oct. 20, 2026

(54) DISPLAY SYSTEMS WITH COMPONENT MOUNTING STRUCTURES

(71) Applicant: Apple Inc., Cupertino, CA (US)

(72) Inventors: Edward S Huo, Sunnyvale, CA (US); Aidan N Zimmerman, Poway, CA (US); Anthony S Montevirgen, Redwood City, CA (US); Evan D Christensen, San Jose, CA (US); Jan K Quijalvo, San Jose, CA (US); Jason C Sauers, Sunnyvale, CA (US); Jason L Slupeiks, Sunnyvale, CA (US); Jeremy C Franklin, San Francisco, CA (US); Ritu Shah, Sunnyvale, CA (US)

( * ) Notice: Subject to any disclaimer, the term of this patent is extended or adjusted under 35 U.S.C. 154(b) by 283 days.

(21) Appl. No.: 18/435,407

(22) Filed: Feb. 7, 2024

(65) Prior Publication Data

US 2024/0176100 A1 May 30, 2024

Related U.S. Application Data

(63) Continuation of application No. PCT/US2022/040418, filed on Aug. 16, 2022.

(60) Provisional application No. 63/237,102, filed on Aug. 25, 2021.

(51) Int. Cl.
*G02B 7/12* (2021.01)
*G06F 1/16* (2006.01)

(52) U.S. Cl.
CPC ............... *G02B 7/12* (2013.01); *G06F 1/163* (2013.01)

(58) Field of Classification Search
CPC .............. G02B 7/12; G02B 2027/0138; G02B 27/0176; G06F 1/163
See application file for complete search history.

(56) References Cited

U.S. PATENT DOCUMENTS

| | | | |
|---|---|---|---|
| 8,928,557 | B2 | 1/2015 | Nakabayashi et al. |
| 9,134,534 | B2 | 9/2015 | Border et al. |
| 9,429,772 | B1 | 8/2016 | Heinrich et al. |
| 9,733,480 | B2 | 8/2017 | Baek et al. |
| 10,218,884 | B2 | 2/2019 | Longbotham et al. |

(Continued)

FOREIGN PATENT DOCUMENTS

| | | | |
|---|---|---|---|
| CN | 205333965 | U | 6/2016 |
| CN | 107465860 | A | 12/2017 |

(Continued)

*Primary Examiner* — Charles S Chang
(74) *Attorney, Agent, or Firm* — Treyz Law Group, P.C.; David K. Cole

(57) ABSTRACT

A head-mounted device may have a head-mounted housing that is configured to be worn on a head of a user. While the head-mounted device is being worn, displays in the head-mounted device may provide images to eye boxes. The user may view images in the eye boxes. The head-mounted housing may have a forward-facing front portion, may have a rearward-facing rear portion that faces away from the front portion towards the eye boxes, and may have a middle portion between the front and rear portions. The middle portion may have openings that receive left and right optical modules containing left and right displays and corresponding left and right lenses. A camera bracket and optical module guide rails may be centrally attached to the middle housing portion between the left and right openings and may have ends that are suspended in air.

19 Claims, 6 Drawing Sheets

(56) References Cited

U.S. PATENT DOCUMENTS

| | | | | |
|---|---|---|---|---|
| 2011/0109871 | A1* | 5/2011 | Chiou | G02C 9/00 351/57 |
| 2017/0168566 | A1 | 6/2017 | Osterhout et al. | |
| 2017/0184863 | A1 | 6/2017 | Balachandreswaran et al. | |
| 2019/0265480 | A1* | 8/2019 | Han | G02B 27/0176 |
| 2020/0174284 | A1 | 6/2020 | Chan et al. | |
| 2021/0063744 | A1 | 3/2021 | Maric et al. | |
| 2021/0103150 | A1 | 4/2021 | Tempel | |
| 2021/0149151 | A1 | 5/2021 | Tseng et al. | |
| 2021/0217147 | A1* | 7/2021 | Edwin | H04N 13/344 |

FOREIGN PATENT DOCUMENTS

| | | | |
|---|---|---|---|
| CN | 217238527 | U | 8/2022 |
| WO | 2022093405 | A2 | 5/2022 |
| WO | 2022093405 | A3 | 11/2022 |

* cited by examiner

DISPLAY SYSTEMS WITH COMPONENT MOUNTING STRUCTURES

This application is a continuation of international patent application No. PCT/US2022/040418, filed Aug. 16, 2022, which claims priority to U.S. provisional patent application No. 63/237,102, filed Aug. 25, 2021, which are hereby incorporated by reference herein in their entireties.

FIELD

This relates generally to electronic devices, and, more particularly, to electronic devices such as head-mounted devices.

BACKGROUND

Electronic devices such as head-mounted devices may have input-output components. The input-output components may include components such as displays and sensors.

SUMMARY

A head-mounted device may have a head-mounted housing that is configured to be worn on a head of a user. While the head-mounted device is being worn, displays in the head-mounted device may provide images to eye boxes where the user's eyes are located. This allows the user to view the images. The head-mounted housing may have a forward-facing front portion, may have a rearward-facing rear portion that faces away from the front portion towards the eye boxes, and may have a middle portion located between the front and rear portions. The middle housing portion may have openings that receive left and right optical modules (sometimes referred to as optical assemblies). The left and right optical modules may contain left and right displays and corresponding left and right lenses. The module-to-module separation of the modules may be adjusted to accommodate users with different interpupillary distances.

Optical component mounting structures may be provided. These structures may be used to mount optical components in the head-mounted device. The optical component mounting structures may include a camera bracket that is used for supporting left and right forward-facing cameras and/or other optical components. The optical component mounting structures may also an optical module mounting system for supporting the left and right optical modules. The optical module mounting system may include optical module guide rails. The left and right optical modules may be slidably mounted to respective sets of left and right optical module guide rails. By sliding the optical modules along the guide rails, optical module spacing may be adjusted. Each optical module may include one of the displays and a lens through which an image from the display may be presented to a corresponding one of the eye boxes.

The optical module guide rails may be attached to a central guide rail support member. The central guide rail support member and a central portion of the camera bracket may be attached to a central portion of the middle housing portion (e.g., a portion of the middle housing portion that is located between the openings for the left and right optical modules). With this configuration, the ends of the camera bracket and the ends of the guide rails may be suspended in air in the interior of the head-mounted housing and so that the ends of these optical component support members are separated by air gaps from adjacent interior surfaces of head-mounted housing. This helps isolate the camera bracket and guide rails from housing impacts due to undesired drop events while helping to prevent over-travel of the bracket ends and guide rails that could potentially lead to plastic deformation of these parts.

DETAILED DESCRIPTION

A head-mounted device may include a head-mounted support structure that allows the device to be worn on the head of a user. The head-mounted device may have displays that are supported by the head-mounted support structure for presenting a user with visual content. The head-mounted device may also have sensors such as front-facing cameras and other sensors for gathering information on the environment surrounding the device. The front-facing cameras may, as an example, be mounted on left and right sides of the device and may be used in providing pass-through video to corresponding left and right displays. To ensure that the cameras and displays are satisfactorily aligned, the cameras may be mounted on a camera bracket that is isolated from surrounding housing structures by gaps. In the event that the device is dropped, the bracket can flex. When the bracket flexes sufficiently to contact surrounding housing structures, the housing structures will serve as stops to prevent over-flexing and plastic deformation of the bracket.

The camera bracket may be mounted at its center to a corresponding central internal housing structure to which an optical module system is also attached. The optical module system may have left and right optical modules containing the left and right displays. The optical modules may be mounted on guide rails that are coupled to the central internal housing structure using a central guide rail support member.

Figure 1:
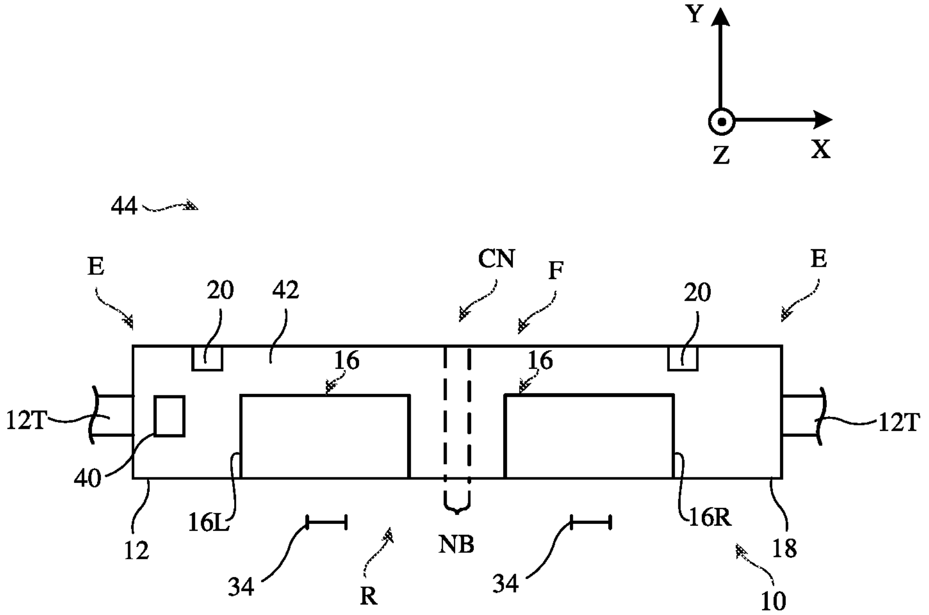
FIG. 1 is a top view of an illustrative electronic device such as a head-mounted device in accordance with an embodiment.

FIG. 1 is a top view of an illustrative head-mounted electronic device. As shown in FIG. 1, head-mounted device 10 may include housing 12. Housing 12 is configured to be worn on a user's head and may sometimes be referred to as a head-mounted housing or head-mounted support structure. Housing 12 may have curved head-shaped surfaces, a nose-bridge portion such as portion NB that is configured to rest on a user's nose when device 10 is on a user's head, may have a strap 12T for supporting device 10 on the user's head, and/or may have other features that allow device 10 to be worn by a user. Housing 12 may have walls or other structures that separate an interior region of device 10 such as interior region 42 from an exterior region surrounding device 10 such as exterior region 44. Electrical components 40 (e.g., integrated circuits, sensors, control circuitry, light-emitting diodes, lasers, and other light-emitting devices, other control circuits and input-output devices, etc.) may be mounted on printed circuits and/or other structures within device 10 (e.g., in interior region 42).

To present a user with images for viewing from eye boxes such as eye box 34, device 10 may include rear-facing displays in optical modules 16 (sometimes referred to as optical assemblies). There may be, for example, a left rear-facing display in left optical module 16L for presenting an image through a left lens to a user's left eye in a left eye box and a right rear-facing display in right optical module 16R for presenting an image through a right lens to a user's right eye in a right eye box.

The user's eyes are located in eye boxes 34 at rear side R of device 10 when inwardly facing surface 18 of housing 12 rests against the outer surface of the user's face. On rear side R, housing 12 may have cushioned structures (sometimes referred to as light seal structures) to enhance user comfort as surface 18 rests against the user's face.

Device 10 may have forward-facing components such has forward-facing cameras 20 on front side F that face outwardly away from the user. Cameras 20 may generally be oriented in the +Y direction of FIG. 1. If desired, the left-hand camera may face slightly to the left and the right-hand camera may face slightly to the right to enhance the overall coverage of cameras 20. During operation, images captured by cameras 20 (sometimes referred to as pass-through video and/or pass-through images) and/or computer-generated content such as text, graphics, etc. may be displayed for the user by displays in modules 16.

Figure 2:
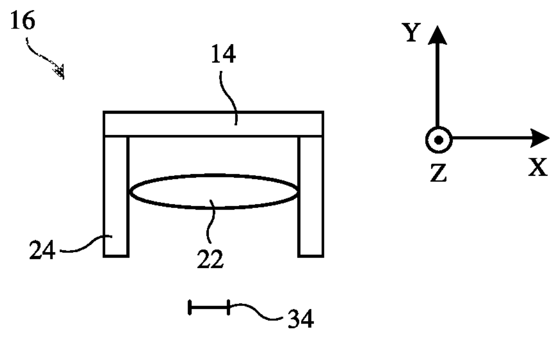
FIG. 2 is top view of an illustrative optical module for an electronic device in accordance with an embodiment.
Figure 3:
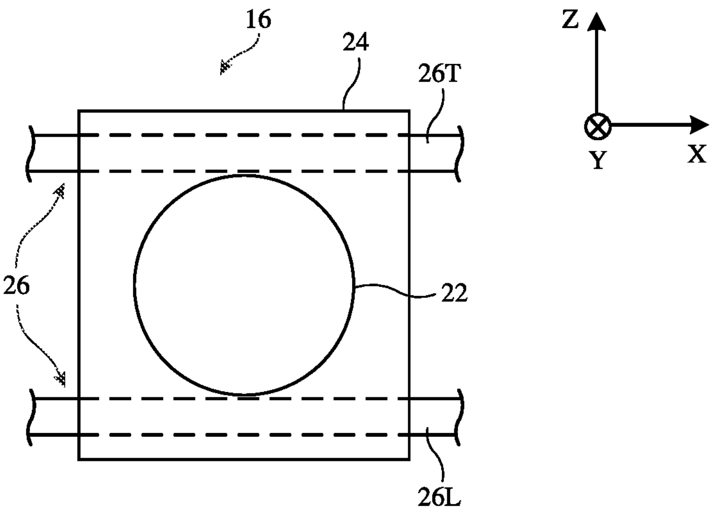
FIG. 3 is a front view of an illustrative optical module for an electronic device in accordance with an embodiment.

FIG. 2 is a cross-sectional top view of an illustrative optical module. As shown in FIG. 2, optical module 16 may include display 14 and lens 22 mounted in optical module housing 24. To adjust the position of modules 16 (e.g., to adjust the module-to-module spacing of modules 16 to accommodate different user interpupillary distances), modules 16 may be slidably mounted on guide structures such as elongated upper and lower guide rails. This type of arrangement is shown in FIG. 3. As shown in FIG. 3, guide rails 26 may include upper guide rail 26T and lower guide rail 26L. Device 10 may have left and right sets of guide rails 26 (each with an upper rail and lower rail) to carry, respectively, left and right modules 16. When it is desired to adjust the spacing between the left and right optical modules, an optical module positioning system may be used to slide each module 16 to a desired location along the length of guide rails 26.

Forward-facing cameras 20 may be used to capture stereo images of the environment surrounding device 10. These images may then be presented in eye boxes 34 by displays 14 in optical modules 16. Misalignment between the left and right forward-facing cameras 20 and between cameras 20 and displays 14 could lead to viewer discomfort. Accordingly, device 10 is preferably provided with component mounting structures that help ensure that cameras 20 are satisfactorily aligned with respect to each other and are satisfactorily aligned with respect to displays 14. These component mounting structures preferably have a robust configuration that helps ensure satisfactory component alignment even in the event of undesired drop events or other challenging operating conditions.

Figure 4:
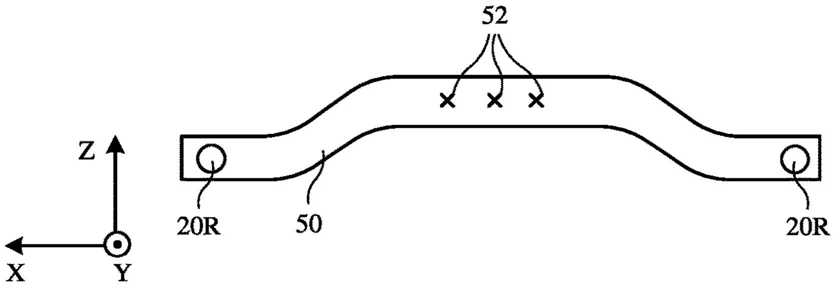
FIG. 4 is front view of an illustrative camera bracket in accordance with an embodiment.

FIG. 4 is a front view of an illustrative mounting structure for cameras 20. As shown in FIG. 4, left forward-facing camera 20L and right forward-facing camera 20R may be mounted to opposing left and right ends of an elongated support member such as camera bracket 50 of FIG. 4. Bracket 50 may be formed from metal (e.g., a magnesium alloy with a high yield stress or other suitable metal alloy or elemental metal), fiber-composite materials (e.g., polymer containing embedded fibers such as fiberglass fibers, carbon fibers, etc.), other polymer materials, ceramic, other materials, and/or combinations of these materials. In an illustrative configuration, bracket 50 is formed from metal, which may allow bracket 50 to serve as a heat sink that helps dissipate heat generated by cameras 20L and 20R during operation. To reduce weight for device 10 and thereby enhance user comfort, bracket 50 may be formed from a lightweight metal such as a magnesium alloy, aluminum, or other light metal.

Figure 5:
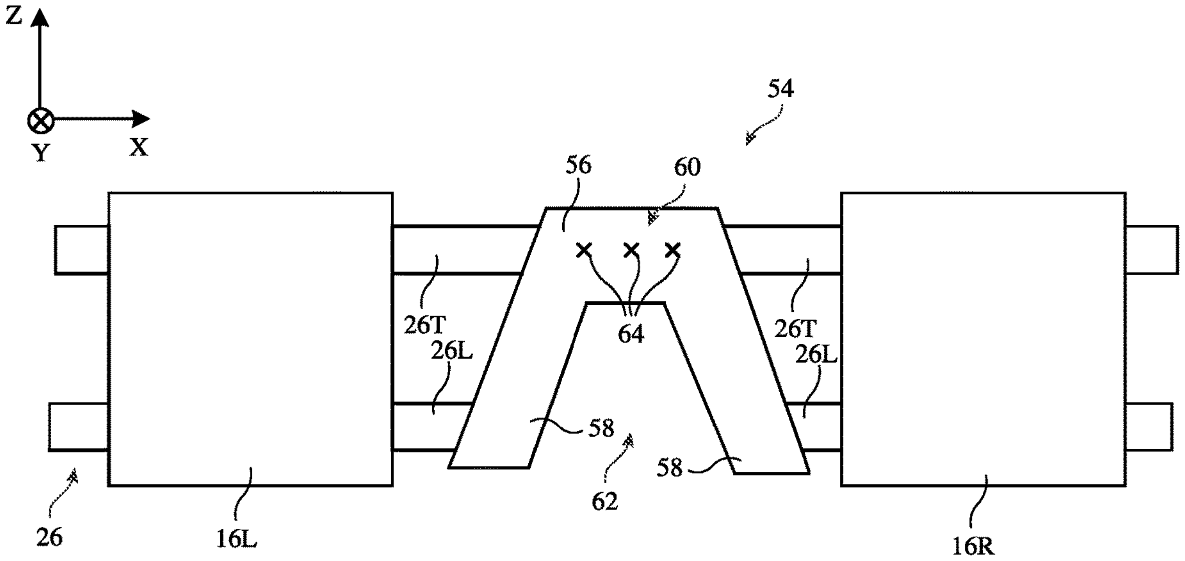
FIG. 5 is a rear view of an illustrative optical module system having a pair of optical modules slidably coupled to guide rails that are attached to a central guide rail support member in accordance with an embodiment.

Bracket 50 may have an elongated strip shape (e.g., the thickness of bracket 50 in the Y dimension may be less than the width of bracket 50 in the Z dimension). As an example, the width of bracket 50 in the Z dimension may be 2-20 mm, at least 3 mm, at least 5 mm, at least 7 mm, less than 25 mm, less than 18 mm, less than 15 mm, less than 12 mm, less than 10 mm, less than 7 mm, or other suitable width and the thickness of bracket 50 in the Y dimension may be 0.1-2 mm, at least 0.2 mm, at least 0.4 mm, at least 0.8 mm, at least 1.2 m, at least 1.5 mm, less than 3 mm, less than 2.5 mm, less than 2.0 mm, less than 1.5 mm, less than 1.0 mm, or other suitable thickness. The length of bracket 50 (e.g., the end-to-end distance along bracket 50 along the X dimension of FIG. 5) may be at least 2 cm, at least 4 cm, at least 8 cm, at least 12 cm, at least 15 cm, at least 20 cm, less than 30 cm, less than 25 cm, less than 21 cm, less than 16 cm, less than 13 cm, or other suitable length. Bracket 50 may be straight or may have a curved shape. In the example of FIG. 5, bracket 50 curves downward at each of its ends relative to its center to help place cameras 20 in desired locations facing forward and slightly downward relative to the front of the user's face.

Bracket 50 may be attached to housing 12 using a center-mounted arrangement. For example, screws or other threaded fasteners may pass through through-hole openings in bracket 50 at locations such as illustrative locations 52 of FIG. 4. The screws may be received in threaded openings in a central internal portion of housing 12 (sometimes referred to as a central chassis portion, a central housing structure, a central housing frame, a chassis, a housing portion, etc.). Bracket 50 is preferably sufficiently rigid to help maintain cameras 20R and 20L in desired positions on bracket 50 relative to each other. The central mounting arrangement by which bracket 50 is attached to the center of the housing chassis allows the ends of bracket 50 to float relative to housing 12 and thereby helps isolate bracket 50 from the influence of housing deformations that may arise in the event that device 10 is dropped or otherwise exposed to excessive force.

Optical modules 16 and bracket 50 may be attached to opposing sides of the central chassis portion. Consider, as an example, the optical module mounting arrangement of FIG. 5. FIG. 5 is a rear view of optical modules 16 viewed from rear side R of device 10. As shown in FIG. 5, optical module system 54 may include left optical module 16L and right optical module 16R. Modules 16L and 16R may be mounted to guide rails 26 such as upper guide rails 26T on the left and right of device 10 and lower guide rails 26L on the left and right of device 10. Guide rails 26 may be attached to the left and right sides of central guide rail support member 56. Member 56, which may be formed from metal, polymer, fiber-composite material (e.g., polymer with embedded fibers), may have through-hole openings at locations such as locations 64 to allow screws or other fasteners to be used to secure member 56 (and thereby secure system 54) to the same portion of the central internal portion of housing 12 to which bracket 50 is attached. As with the central mounting arrangement of bracket 50, the use of central mounting (e.g., attachment of member 56 of system 54 to housing 12 while leaving the left and right ends of system 54 free), may help isolate bracket 50 from the influence of external housing deformations in the event that device 10 is subject to a drop or other undesired excessive force.

In component and optical module mounting structures of the types shown in FIGS. 4 and 5, bracket 50 of FIG. 4 is attached to the front surface of the central internal portion of housing 12, whereas member 56 of system 54 is secured to the opposing rear surface of the central internal portion of housing 12. If desired, other central mounting arrangements may be used (e.g., arrangements in which some or all of member 56 and/or bracket 50 are formed as integral portions of a housing chassis, etc.).

Figure 6:
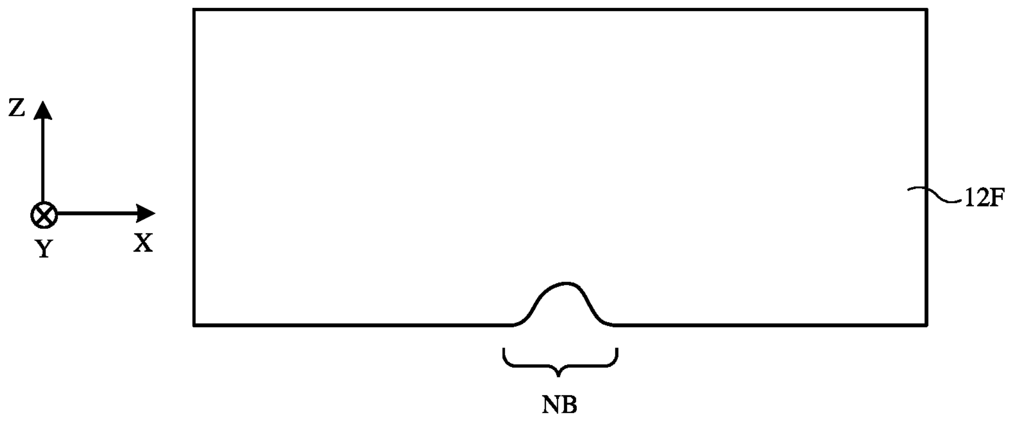
FIG. 6 is a diagram of an illustrative front housing portion for an electronic device in accordance with an embodiment.
Figure 7:
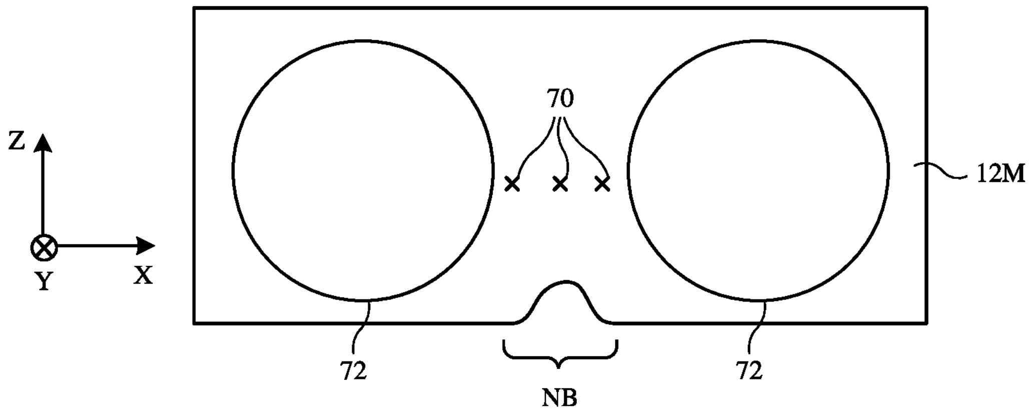
FIG. 7 is a diagram of an illustrative middle housing portion for an electronic device in accordance with an embodiment.
Figure 8:
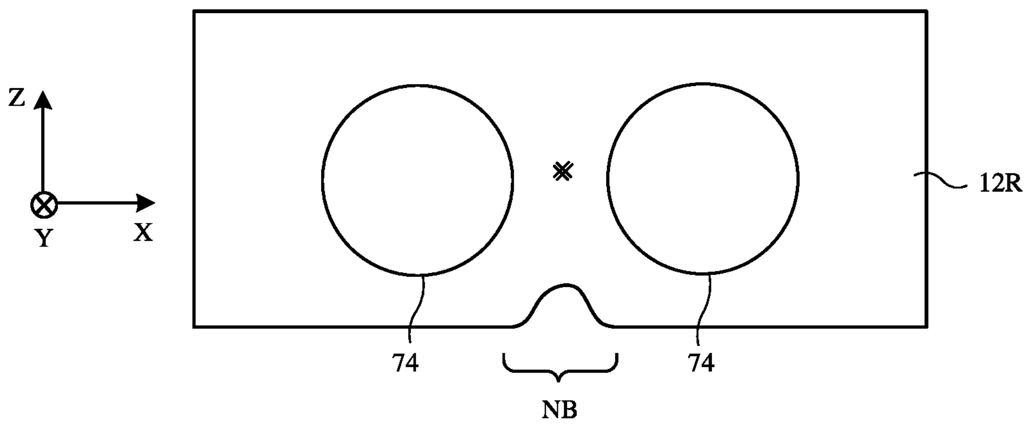
FIG. 8 is a diagram of an illustrative rear housing portion for an electronic device in accordance with an embodiment.

FIGS. 6, 7, and 8 are rear views of illustrative front, middle, and rear portions of housing 12, respectively. When assembled to form device 10, middle portion 12M of FIG. 7 is sandwiched between front portion 12F of FIG. 6 and rear portion 12R of FIG. 8.

As shown in FIG. 6, housing 12 may include a front housing portion 12F that covers the front of device 10. Front portion 12F may have a forward-facing (publicly viewable) display and/or other components covered with a protective layer (e.g., a layer of glass or other display cover layer). The cover layer may have dark borders (e.g., inner surfaces covered with black ink or other opaque masking material to help hide internal device components from view). Camera window openings and other optical windows for light-based sensors and other components may be formed in the display cover layer. For example, camera window openings may be formed in the dark borders or other portions of the display cover layer of front housing portion 12F. These camera window openings may each be aligned with a respective optical component on bracket 50 (e.g., a first window aligned with camera 20R, a second window aligned with camera 20L, etc.). This type of window arrangement allows cameras such as cameras 20R and 20L and other optical components to operate in the forward direction (e.g., in the +Y direction of FIG. 1 and/or in directions that are respectively angled slightly to the left of the Y axis and slightly to the right of the Y axis for cameras 20L and 20R, respectively).

Middle housing portion 12M of FIG. 7 may include one or more structures of one or more different materials that are used in forming an internal chassis for housing 12. Openings 72 may be formed in portion 12M to accommodate optical modules 16L and 16R of system 54 (FIG. 5). The peripheral portions of middle housing portion 12M may be attached to corresponding peripheral portions of front housing portion 12F and rear housing portion 12R to secure portions 12F, 12M, and 12R together to form housing 12 of device 10.

As shown in FIG. 7, portion 12M may include structures that serve as a mounting point for bracket 50 and system 54. For example, portion 12M may include central internal housing portion CN (e.g., an internal chassis portion) with threaded openings at locations such as locations 70. Screws or other fasteners (e.g., screws passing through openings in bracket 50 at locations 52 of FIG. 4) may be received within the threaded openings in the front side of housing portion CN to secure bracket 50 to the front side of portion CN. Screws or other fasteners (e.g., screws passing through openings in member 56 of system 54) may likewise be received within threaded openings in the rear side of housing portion CN to secure member 56 of system 54 to the rear side of housing portion CN. Portion CN is centrally located (e.g., portion CN is in the center of device 10 between openings 72 and is laterally equidistant from the peripheral left and right edges of housing 12), so this type of mounting scheme for bracket 50 and system 54 may sometimes be referred to as a central mounting scheme.

As shown in FIG. 8, housing 12 may include rear housing portion 12R. Openings 74 in rear housing portion 12R may be aligned with optical modules 12L and 16R, respectively, so that a user with left and right eyes located respectively in left and right eye boxes 34 can view images on displays 14 through respective lenses 22. Rear housing portion 12R may, if desired, include a fabric layer or other stretchable cosmetic covering layer that helps hide internal components from view, while being sufficiently stretchable to accommodate movement of modules 16 towards and away from each other (e.g., when the module-to-module spacing of device 10 is being adjusted to accommodate different user interpupillary distances). Rear housing portion 12R may also include a compressible ring-shaped light seal member (sometimes referred to as a cushion or light seal) that runs along the peripheral edge of housing portion 12R.

Figure 9:
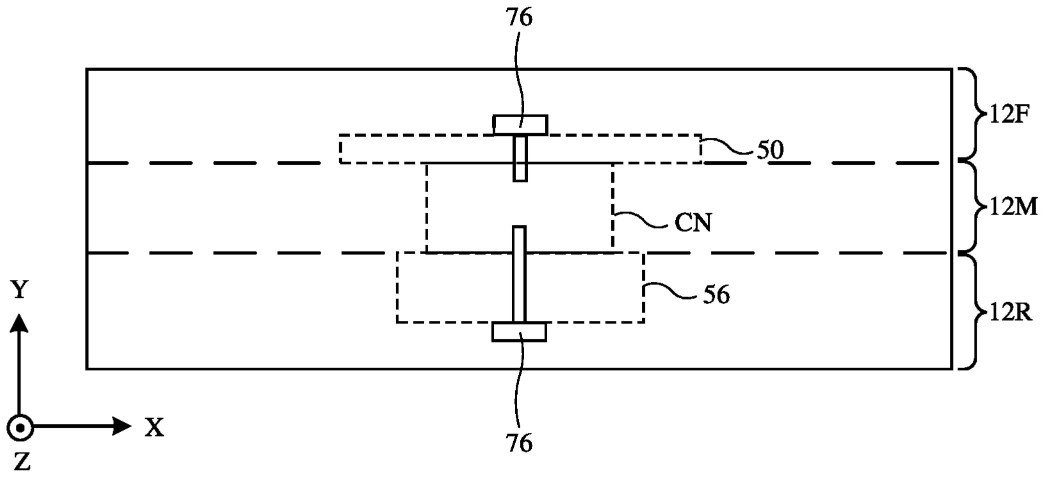
FIG. 9 is a top view of an illustrative electronic device in accordance with an embodiment.

Rear housing portion 12R and front housing portion 12F may be attached to the rear and front sides of housing portion 12M, respectively (e.g., the peripheral edge of housing portion 12R may be joined to the peripheral edge of housing portion 12M and the peripheral edge of housing portion 12F may be joined to the peripheral edge of housing portion 12M. As shown in the top view of FIG. 9, when housing portions 12F, 12M, and 12R are joined together to form housing 12 of device 10, fasteners such as screws 76 may be used to attach bracket 50 to the front side of central portion CN and may be used to attach member 56 to the opposing rear side of central portion CN.

To avoid undesired plastic deformation to component support structures such as bracket 50 and system 54 during a drop even or other undesirable event that imparts excessive force to the exterior of housing 12, housing 12 may be configured so that the left and right portions of bracket 50 and the left and right portions of system 54 are separated from adjacent portions of housing 12 by air gaps (or gaps filled with soft material such as foam or other elastomeric material). With this type of arrangement, only the central portion of each component support structure (e.g., a segment made up of the middle 10% or less, the middle 20% or less, or other suitable central portion of the end-to-end length of each component support structure) is directly attached to portion CN, while the remaining end portions of each component support structure float with respect to housing 12.

Figure 10:
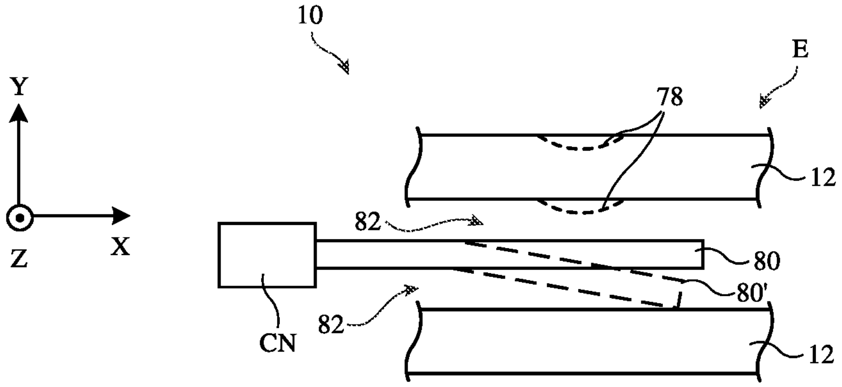
FIGS. 10 and 11 are diagrams showing how electronic device housing structures may be separated by air gaps from end portions of optical component support members such as a camera bracket and/or optical module guide rails in accordance with an embodiment.
Figure 11:
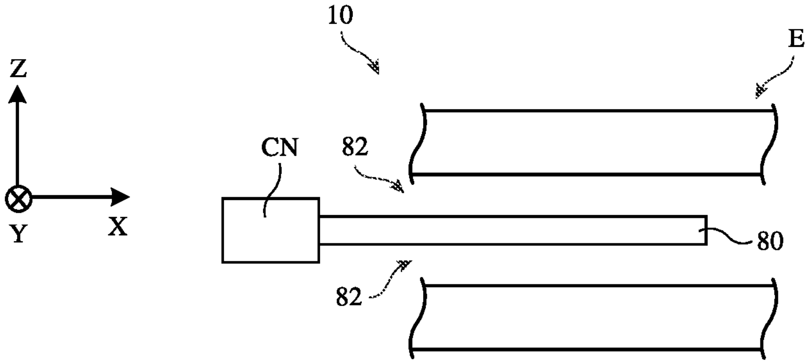

Consider, as an example, the arrangements of FIGS. 10 and 11. FIG. 10 is a cross-sectional top view of device 10 and FIG. 11 is a cross-sectional rear view of device 10. These FIGS. show how, at edge E, the right portion of member 80 (e.g., the right side of bracket 50 and the right side of each of the elongated support structures of system 54 such as rail 26T and rail 26L) can be separated from adjacent inwardly facing surfaces of housing 12 (e.g., inwardly facing structures in housing portions 12F and/or 12R) by gaps 82 (e.g., air gaps or gaps filed with foam or other compressible material that does not plastically deform when compressed).

The same gaps 82 that are formed on the right side of device 10 may be formed around the corresponding left portion of member 80. For example, both the right and left ends of bracket 50 may be suspended in air about center portion CN where bracket 50 is attached to housing portion 12M. Both the right and left portions of housing system 54 such as the right and left ends of upper rail 26T and the right and left ends of lower rail 26T may also be suspended in air about center portion CN, where system 54 is attached to housing portion 12M. These suspended end portions (illustrated as member 80 in FIGS. 10 and 11) may be separated by gaps 82 lying in the X-Y plane (see, e.g., FIG. 10, which shows how gaps 82 may be formed in front of member 80 and to the rear of member 80) and may be separated by gaps 82 lying in the X-Z plane (see, e.g., FIG. 11, which shows how gaps 82 may be formed above and below member 80).

By suspending the ends (e.g., the non-central portion) of bracket 50 and rods 26T/26L in air (or a compressible material such as foam) relative to housing 12 as shown in FIGS. 10 and 11, space is made available to accommodate small amounts of flexing in these component support structures in the event that device 10 is dropped or otherwise subjected to excessive force.

Consider, as an example, the arrangement of FIG. 10. As shown in FIG. 10, when device 10 is dropped, member 80 (e.g., bracket 50 or guide rail 26), is deflected to position 80', at which point member 80 contacts the inwardly facing surface of housing 12 and is prevented from further flexing due to contact with this inner housing surface. The size of gap 82 (which may be, for example, at least 0.5 mm, at least 1, mm, at least 2 mm, at least 4 mm, at least 8 mm, less than 20 mm, less than 10 mm, less than 5 mm, less than 2.5 mm, less than 1.2 mm, or other suitable size) is preferably sufficiently small to prevent member 80 from deforming plastically when flexed to position 80'. As a result, member 80 experiences only elastic deformation when bent sufficiently to span gap 82 and reach position 80'. After the stress imposed by the drop event ends, member 80 will therefore return to its original unbent shape.

In addition to being sufficiently small to prevent member 80 from experiencing excessive bending and therefore exhibiting undesired plastic deformation, the size of gaps 82 may be selected to be sufficiently large to help isolate member 80 from movement and potential deformation due to deformation of housing 12. As shown in FIG. 10, for example, damage from a drop event may cause housing 12 to temporarily or permanently deform inwardly as shown by dent 78. Aside from its centrally mounted portion, member 80 floats in air due to the presence of gaps 82 and is therefore isolated from pressure from such housing deformations.

In some embodiments, sensors may gather personal user information. To ensure that the privacy of users is preserved, all applicable privacy regulations should be met or exceeded and best practices for handling of personal user information should be followed. Users may be permitted to control the use of their personal information in accordance with their preferences.

In accordance with an embodiment, a head-mounted device is provided that includes a head-mounted housing having a central interior portion and having interior surfaces, a bracket mounted to the central interior portion, the bracket has opposing left and right ends that are suspended in air within an interior of the head-mounted housing and are separated from the interior surfaces by gaps, and left and right cameras mounted, respectively, to the left and right ends of the bracket.

In accordance with another embodiment, the head-mounted device includes left and right optical assemblies configured to display images respectively in left and right eye boxes located adjacent to the head-mounted housing.

In accordance with another embodiment, the left and right cameras include respective left and right forward-facing cameras that face away from the eye boxes and that are configured to capture images in front of the head-mounted housing.

In accordance with another embodiment, the head-mounted device includes left and right optical assembly guide rails coupled to the central interior portion.

In accordance with another embodiment, the left optical assembly is slidably coupled to the left optical assembly guide rail and the right optical assembly is slidably coupled to the right optical assembly guide rail.

In accordance with another embodiment, the left and right optical assembly guide rails have end portions that are suspended in air in the interior.

In accordance with another embodiment, the head-mounted device includes a fastener configured to attach a central segment of the bracket to the central interior portion of the head-mounted housing.

In accordance with another embodiment, the head-mounted device includes a guide rail support member configured to receive the left and right guide rails.

In accordance with another embodiment, the head-mounted device includes a fastener configured to attach the guide rail support member to the central interior portion.

In accordance with another embodiment, the head-mounted housing is configured so that the interior surfaces form stops that prevent the left and right ends from exhibiting plastic deformation due to bending across the gaps.

In accordance with an embodiment, a head-mounted device is provided that includes a head-mounted housing having a central interior portion and having interior surfaces, a guide rail support member attached to the central interior portion, and left and right optical assembly guide rails attached to the guide rail support member, the left and right optical assembly guide rails are suspended in air in an interior of the head-mounted housing and are separated from the interior surface by gaps.

In accordance with another embodiment, the head-mounted device includes left and right optical assemblies slidably coupled to the left and right optical assembly guide rails, respectively.

In accordance with another embodiment, the left optical assembly has a left lens and a left display configured to display a left image to a left eye box through the left lens and the right optical assembly has a right lens and a right display configured to display a right image to a right eye box through the right lens.

In accordance with another embodiment, the head-mounted housing has a front portion and a rear portion and the central interior portion is between the front portion and the rear portion and is centrally located between opposing left and right sides of the head-mounted housing.

In accordance with another embodiment, the head-mounted device includes a camera bracket that is centrally mounted to the central interior portion and that has opposing left and right ends that are suspended in air and separated from the interior surfaces.

In accordance with another embodiment, the head-mounted device includes left and right forward-facing cameras mounted respectively to the left and right ends of the camera bracket.

In accordance with another embodiment, the head-mounted device includes first screws that attach a central segment of the camera bracket to the central interior portion and second screws that attach the guide rail support member to the central interior portion.

In accordance with another embodiment, the head-mounted housing includes a front portion, a rear portion, and a middle portion between the front and rear portions, the middle portion has left and right openings configured to receive, respectively, the left and right optical assemblies and the central interior portion is formed from part of the middle portion located between the left and right openings.

In accordance with an embodiment, a head-mounted device is provided that includes a head-mounted housing, a camera bracket having opposing left and right ends that are suspended in air and that do not contact the head-mounted housing and having a central segment that is located between the left and right ends and that is attached to the head-mounted housing, a left camera mounted to the left end, and a right camera mounted to the right end.

In accordance with another embodiment, the head-mounted device includes left and right optical modules respectively mounted to left and right optical module guide rails, the left and right optical module guide rails have ends that are suspended in air and that do not contact the head-mounted housing.

The foregoing is merely illustrative and various modifications can be made to the described embodiments. The foregoing embodiments may be implemented individually or in any combination.

What is claimed is:

1. A head-mounted device, comprising:

a head-mounted housing having a central interior portion, a left portion on a first side of the central interior portion, and a right portion on a second side of the central interior portion, opposite the first side, and having interior surfaces;

left and right optical assemblies respectively in the left and right portions of the head-mounted housing;

a bracket mounted to the central interior portion, wherein the bracket has opposing left and right ends that are suspended in air within an interior of the head-mounted housing across the left and right portions of the head-mounted housing and are separated from the interior surfaces by gaps; and left and right cameras mounted, respectively, to the left and right ends of the bracket.

2. The head-mounted device defined in claim 1 wherein the left and right optical assemblies are configured to display images respectively in left and right eye boxes located adjacent to the head-mounted housing.

3. The head-mounted device defined in claim 2 wherein the left and right cameras comprise respective left and right forward-facing cameras that face away from the left and right eye boxes and that are configured to capture images in front of the head-mounted housing.

4. The head-mounted device defined in claim 3 further comprising left and right optical assembly guide rails coupled to the central interior portion.

5. The head-mounted device defined in claim 4 wherein the left optical assembly is slidably coupled to the left optical assembly guide rail and wherein the right optical assembly is slidably coupled to the right optical assembly guide rail.

6. The head-mounted device defined in claim 5 wherein the left and right optical assembly guide rails have end portions that are suspended in air in the interior.

7. The head-mounted device defined in claim 6 further comprising a fastener configured to attach a central segment of the bracket to the central interior portion of the head-mounted housing.

8. The head-mounted device defined in claim 6 further comprising a guide rail support member configured to receive the left and right optical assembly guide rails.

9. The head-mounted device defined in claim 8 further comprising a fastener configured to attach the guide rail support member to the central interior portion.

10. The head-mounted device defined in claim 1 wherein the head-mounted housing is configured so that the interior surfaces form stops that prevent the left and right ends from exhibiting plastic deformation due to bending across the gaps.

11. A head-mounted device, comprising:

a head-mounted housing having a central interior portion and having interior surfaces;

a guide rail support member attached to the central interior portion;

left and right optical assembly guide rails attached to the guide rail support member, wherein the left and right optical assembly guide rails are suspended in air in an interior of the head-mounted housing and are separated from the interior surfaces by gaps; and left and right optical assemblies slidably coupled to the left and right optical assembly guide rails, respectively.

12. The head-mounted device defined in claim 11 wherein the left optical assembly has a left lens and a left display configured to display a left image to a left eye box through the left lens and wherein the right optical assembly has a right lens and a right display configured to display a right image to a right eye box through the right lens.

13. The head-mounted device defined in claim 12 wherein the head-mounted housing has a front portion and a rear portion and wherein the central interior portion is between the front portion and the rear portion and is centrally located between opposing left and right sides of the head-mounted housing.

14. The head-mounted device defined in claim 13 further comprising a camera bracket that is centrally mounted to the central interior portion and that has opposing left and right ends that are suspended in air and separated from the interior surfaces.

15. The head-mounted device defined in claim 14 further comprising left and right forward-facing cameras mounted respectively to the left and right ends of the camera bracket.

16. The head-mounted device defined in claim 15 further comprising first screws that attach a central segment of the camera bracket to the central interior portion and second screws that attach the guide rail support member to the central interior portion.

17. The head-mounted device defined in claim 11 wherein the head-mounted housing comprises:

a front portion;

a rear portion; and a middle portion between the front and rear portions, wherein the middle portion has left and right openings configured to receive, respectively, the left and right optical assemblies and wherein the central interior portion is formed from part of the middle portion located between the left and right openings.

18. A head-mounted device, comprising:

a head-mounted housing;

a camera bracket having opposing left and right suspended portions that are suspended in air and that do not contact the head-mounted housing and having a central segment that is located between the left and right suspended portions and that is attached to the head-mounted housing;

a left camera mounted to the left suspended portion; and a right camera mounted to the right suspended portion.

19. The head-mounted device defined in claim 18 further comprising left and right optical modules respectively mounted to left and right optical module guide rails, wherein the left and right optical module guide rails have ends that are suspended in air and that do not contact the head-mounted housing.

* * * * *